Figure 1:
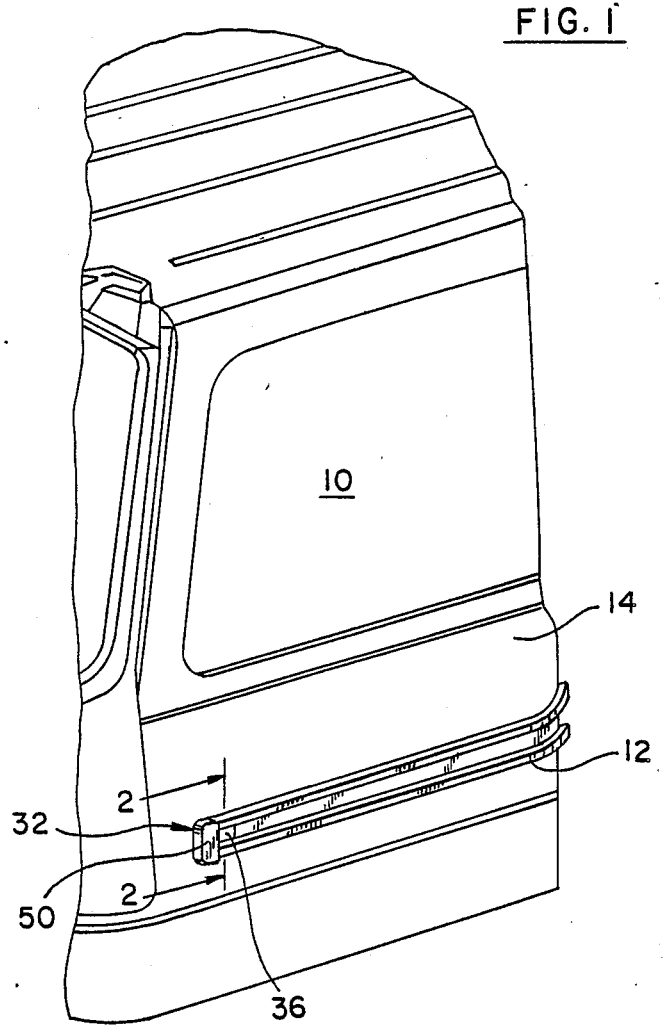

United States Patent [19]

Schubring

[11] Patent Number: 4,934,023
[45] Date of Patent: Jun. 19, 1990

[54] VEHICULAR GUIDE TRACK ASSEMBLY WITH END CAP

[75] Inventor: Gary L. Schubring, New Baltimore, Mich.

[73] Assignee: Emhart Industries, Inc., Towson, Md.

[21] Appl. No.: 431,960

[22] Filed: Nov. 3, 1989

[51] Int. Cl.⁵ .................. E05D 13/00; E05D 15/00
[52] U.S. Cl. .................................. 16/95 R; 16/87 R
[58] Field of Search ............ 16/90, 95 R, 94 R, 94 D, 16/87 R

[56] References Cited

U.S. PATENT DOCUMENTS 4,068,345 1/1978 Hehl et al. ...................... 16/94 D

FOREIGN PATENT DOCUMENTS 1526549 5/1968 France .................. 16/87 R

Primary Examiner—Richard K. Seidel
Assistant Examiner—Carmine Cuda
Attorney, Agent, or Firm—Spencer T. Smith

[57] ABSTRACT

Laterally opened vehicular doors are guided by a track assembly which is made up of a track and an end cap. The end cap has a fastener portion which cooperates with the track to positively secure the end cap to the track without the use of a screw. A cantilevered ramped locking tab is forced into a locating hole in the bottom of the track by a tension arm which is deflected by the top of the track. The locking tab engages a side wall of the hole to locate a post against the side of the vehicle.

2 Claims, 2 Drawing Sheets

VEHICULAR GUIDE TRACK ASSEMBLY WITH END CAP

The present invention relates to guide track assemblies which are secured to the wall of a van type vehicle and which guide the movement of a door which is laterally displaced to open or close the doorway.

Such tracks must be properly finished with an end cap and traditionally the end cap is secured by a screw to the metal wall (panel) of the vehicle. Screws come loose and fail to consistently maintain the end cap in position and as a result end caps are prone to rattle and this is very undesirable in todays vehicles where rattle free operation is a prime objective.

It is accordingly an objective of the present invention to provide an end cap for a vehicular track which will be permanently secured and permanently rattle free.

Other objectives and advantages of the present invention will become apparent from the following portion of this specification and from the accompanying drawings which illustrate in accordance with the patent statutes, a presently preferred embodiment incorporating the principles of the invention.

Figure 2:
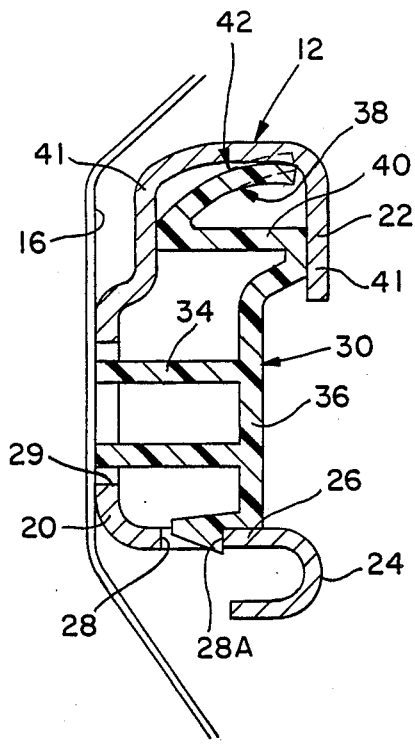
Figure 3:
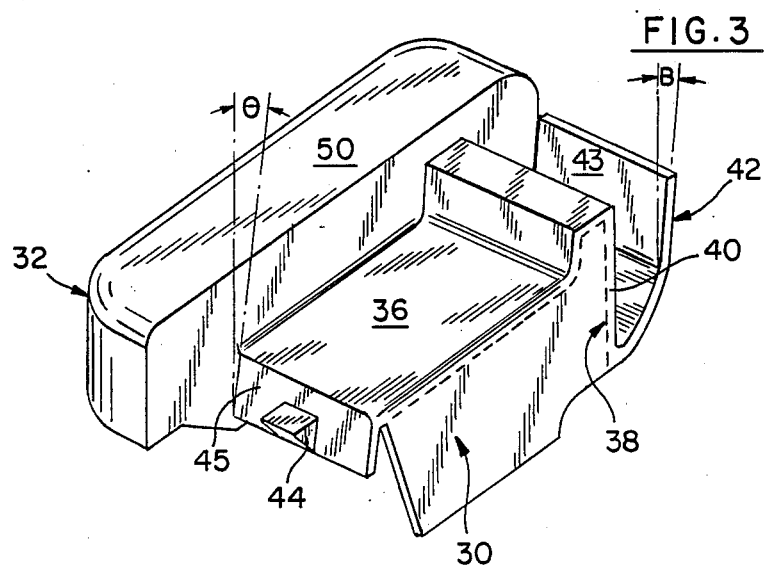

Referring to the drawings:

FIG. 1 is a side oblique view of a portion of a van type vehicle which has a guide track for a laterally mounted door; and FIG. 2 is a cross sectional view of a portion of the end cap which is secured within the track taken at 2—2 of FIG. 1; and FIG. 3 is an oblique view of the end cap.

It is conventional in van type vehicles 10 to use laterally opening rear side doors which have a roller set which is received and guided by an external track 12 secured to the side wall 14 of the van 10. The track which is located within a recess 16 in the wall 14 has a flat side wall 20 which merges into an upside down "U" shaped top portion 22 and a "J" shaped bottom portion 24. Defined in the leg 26 of the bottom "J" portion 24 which defines the bottom of the track is a square locating hole 28 and defined in the side wall 20 is a large opening 29.

To finish the end of the track the fastener portion 30 of an end cap 32 is inserted into the open end of the track. This fastener portion has a cylindrical post 34 which will enter the side wall opening 29 and rest flush with the vehicle side wall 14. The post 34 merges into the front vertical wall 36 of the fastener portion 30. At the top of the front wall 36 is an S shaped portion 38 including a horizontal cross piece 40 the same length as the separation between the legs 41 of the U shaped portion 22 and an elongated tension arm 42. The outer end 43 of the tension arm is bent outwardly by an angle B. A ramped locking tab 44 projects outwardly from a cantilevered member 45 which joins the bottom of the front wall 36 of the fastener portion 30. This cantilevered member 45 also is bent outwardly ($\theta$). When the fastener portion 30 is pushed into the open end of the track the ramped locking tab 44 snaps into the hole 28 forcefully engaging the outside edge 28A of the hole forcing the post 34 inward against the van body 16 thereby additionally positively locating the end cap from front to back. The deflected tension arm 42 and cantilevered member 45 positively locates the end cap from top to bottom. The remaining exposed portion 50 of the end cap provides a smooth end for the track.

I claim:

1. A vehicular guide track assembly comprising a track open at one end and including
    an inner side wall portion
    a top inverted U shaped portion,
    a bottom horizontal portion, and
    a hole in said bottom horizontal portion having a locating side wall surface,
    an end cap having a fastener portion including
        an elongated tension arm adapted to engage and be deflected by the bottom of said U shaped portion when inserted into the open end of the track,
        an elongated cantilevered portion adapted to engage and be deflected by said bottom horizontal portion when inserted into the open end of the track and having a ramped locking tab extending outwardly therefrom and adapted to be forcefully located within said locating hole with said ramped locking tab engaging said locating side wall surface and
        a body portion intermediate said elongated tension arm and said elongated cantilevered portion having a cylindrical post for maintaining said ramped locking tab in engagement with said side wall surface of said locating hole.

2. A vehicular track assembly according to claim 1, wherein said body portion further comprises a horizontally extending cross piece connected at one end to said tension arm, the length of said cross piece corresponding to the separation between the legs of said U shaped portion.

* * * * *